(12) United States Patent
Shibutani et al.

(10) Patent No.: US 9,487,650 B2
(45) Date of Patent: Nov. 8, 2016

(54) RESIN COMPOSITION AND USE THEREOF (71) Applicants: THE NIPPON SYNTHETIC CHEMICAL INDUSTRY CO., LTD., Osaka (JP); ASAHI GLASS COMPANY, LIMITED, Tokyo (JP)

(72) Inventors: Mitsuo Shibutani, Osaka (JP); Akinobu Inakuma, Osaka (JP); Yasuhiro Hirano, Osaka (JP); Seiji Maeda, Osaka (JP); Eiichi Nishi, Tokyo (JP); Shigeru Aida, Tokyo (JP); Shintaro Fukunaga, Tokyo (JP)

(73) Assignees: THE NIPPON SYNTHETIC CHEMICAL INDUSTRY CO., LTD., Osaka (JP); ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/379,530

(22) PCT Filed: Apr. 26, 2013

(86) PCT No.: PCT/JP2013/062325
§ 371 (c)(1),
(2) Date: Aug. 19, 2014

(87) PCT Pub. No.: WO2013/191975
PCT Pub. Date: Oct. 31, 2013

(65) Prior Publication Data
US 2015/0038633 A1    Feb. 5, 2015

(30) Foreign Application Priority Data

Apr. 27, 2012  (JP) ................. 2012-103241

(51) Int. Cl.
C08L 29/04      (2006.01)
C08F 8/12       (2006.01)
C08L 27/18      (2006.01)
H01M 4/62       (2006.01)
C08J 3/00       (2006.01)

(52) U.S. Cl.
CPC ............... C08L 29/04 (2013.01); C08F 8/12 (2013.01); C08J 3/005 (2013.01); C08L 27/18 (2013.01); H01M 4/623 (2013.01); C08J 2329/04 (2013.01); C08J 2427/22 (2013.01); C08L 2201/14 (2013.01); C08L 2203/16 (2013.01); C08L 2205/025 (2013.01); C08L 2205/03 (2013.01)

(58) Field of Classification Search
CPC ..... B32B 27/08; B32B 27/306; C08L 29/04; C08L 67/02; C08L 27/18; C08L 2205/03; C08L 2205/025; C08L 2201/14; C08L 2203/16; Y10T 428/31511; Y10T 428/31551; Y10T 428/31786; C08J 3/005; C08J 2329/04; C08J 2427/22; H01M 4/623; C08F 8/12
See application file for complete search history.

(56) References Cited

U.S. PATENT DOCUMENTS

| | | | |
|---|---|---|---|
| 2004/0062989 | A1 | 4/2004 | Ueno et al. |
| 2010/0047693 | A1 | 2/2010 | Yang et al. |
| 2010/0092871 | A1 | 4/2010 | Medlege et al. |
| 2012/0157627 | A1 | 6/2012 | Shibutani et al. |

FOREIGN PATENT DOCUMENTS

| | | | |
|---|---|---|---|
| CN | 1714465 | * | 12/2005 |
| JP | S55-95270 | A | 7/1980 |
| JP | 2001-114977 | A | 4/2001 |
| JP | 2002-246029 | A | 8/2002 |
| JP | 2002-256129 | A | 9/2002 |
| JP | 2003-171522 | A | 6/2003 |
| JP | 2004-075866 | A | 3/2004 |
| JP | 2004-300193 | A | 10/2004 |
| JP | 2007-161795 | A | 6/2007 |
| JP | 2008-204647 | A | 9/2008 |
| JP | 2011-054445 | | * 3/2011 |
| JP | 2011-54445 | A | 3/2011 |
| JP | 2011-074364 | A | 4/2011 |
| JP | 2011-173998 | A | 9/2011 |
| WO | 2004/049475 | A1 | 6/2004 |

OTHER PUBLICATIONS

International search report issue with respect to application No. PCT/JP2013/062325, mail date is Jul. 9, 2013.
European Search Report issued with respect to application No. 13781259.0, mail date is Nov. 23, 2015.

* cited by examiner

Primary Examiner — Robert Jones, Jr.
(74) Attorney, Agent, or Firm — Greenblum & Bernstein, P.L.C.

(57) ABSTRACT

Disclosed is a resin composition comprising a melt-moldable side chain 1,2-diol-containing PVA-based resin (A), and fluororesin containing a polar functional group capable of reacting with or forming hydrogen bond(s) with hydroxyl group (B). The component (A) and the component (B) have excellent affinity, and therefore if either the component (A) or component (B) becomes matrix, the other can be finely dispersed into the matrix, thus providing a resin composition having excellent gas-barrier property, solvent resistance, and bending fatigue resistance. The present invention also provides emulsified dispersion and binder in which the resin composition is used.

15 Claims, 3 Drawing Sheets

Fig.1 xylene styrene

Fig.2 xylene styrene

RESIN COMPOSITION AND USE THEREOF

TECHNICAL FIELD

The present invention relates to a resin composition comprising polyvinyl alcohol-based resin. More particularly, the present invention relates to a resin composition excellent in gas-barrier property, bending fatigue resistance, and solvent resistance, and having lower surface free energy. The present invention also relates to use of the composition and a producing method of the composition.

BACKGROUND ART

Polyvinyl alcohol (hereinafter, abbreviated as PVA)-based resin has an excellent gas-barrier property, toughness, transparency, and solvent resistance, and therefore is suitable for binder and wrapping material for various articles.

In general, PVA-based resin is substantially impossible to be melt-molded because the PVA-based resin has a melting point close to its decomposition temperature. For this reason, the preparation of aqueous solution of the PVA-based resin is required prior to molding PVA-based resin. The solution is cast and dried to provide a film, or the solution is applied to a surface of a variety of substrate and dried. Such molding processes inhibit wide use in PVA-based resin for wrapping.

In recent years, a PVA-based resin containing 1,2-diol structural unit at side chain thereof (hereinafter, sometimes called as "side chain 1,2-diol-containing PVA-based resin") is suggested as a melt-moldable PVA-based resin having excellent gas-barrier property, in e.g. JP2004-075866A (patent document 1).

The side chain 1,2-diol-containing PVA-based resin is lowered in crystallinity due to steric hindrance of the side chain, comparing to conventional PVA-based resins, and has a lowered melting point. Nevertheless, the side chain 1,2-diol-containing PVA-based resin exhibits greater gas-barrier property than a conventional PVA-based resin. This is supposed that the side chain 1,2-diol-containing PVA-based resin would have an amorphous portion strongly hydrogen bonded between hydroxyl groups of the side chains, thereby securing excellent gas-barrier property regardless of the lowered crystallinity comparing to the conventional PVA-based resin.

High crystallinity and strong hydrogen bonds of the molecular chain of PVA-based resin give excellent gas-barrier property, but cause lowering of flexibility or impact resistance comparing to other thermoplastic resin.

It is widely made a study that a thermoplastic elastomer is added to PVA-based resin to form a sea-island structure in which PVA-based resin is sea part and thermoplastic elastomer is island part, thereby improving flexibility and impact resistance without impairing excellent gas-barrier property inherent in PVA-based resin.

For example, JP2001-114977A (patent document 2) discloses the improvement of flexibility and impact resistance of the PVA-based resin by adding a hydrogenated block copolymer obtained by hydrogenating a block copolymer containing at least two polymer blocks of vinyl aromatic compound as a thermoplastic elastomer and at least one polymer block of conjugated diene compound.

In order to obtain a PVA-based resin molded article having highly improved flexibility, a resin composition employing a combination suggested in patent document 2, namely a resin composition containing melt-moldable side chain 1,2-diol-containing PVA-based resin and thermoplastic elastomer (hydrogenated block copolymer), was studied and found that the flexibility was improved but not satisfied level. In particular, pinholes sometimes occurred in a film made from the resin composition when subjected to severe conditions like repeating flexion, which drastically lowers gas-barrier property of the film.

The present inventors have further studied a resin composition comprising the side chain 1,2-diol-containing PVA-based resin for improving bending fatigue resistance, and suggested, in JP2011-74364A (patent document 3), a resin composition employing a mixture of block copolymer without carboxyl group and block copolymer with carboxyl group as a thermoplastic elastomer component.

PRIOR ART

Patent Document

[patent document 1] JP2004-075866A
[patent document 2] JP2001-114977A
[patent document 3] JP2011-74364A

SUMMARY OF THE INVENTION

Technical Problem to be Solved by the Invention

PVA-based resin composition disclosed in patent document 3 is melt-moldable and improved in bending fatigue resistance still with gas-barrier property inherent in PVA-based resin. However, another problem on the molded article of the resin composition was arisen that the solvent resistance inherent in PVA-based resin was impaired due to the block copolymer as the elastomer component. Poor solvent resistance limits use of the resin composition for a wrapping container, binder or adhesive.

Under these situations, the object of the present invention is to provide a resin composition containing a melt-moldable PVA-based resin and having an improved flexibility such as bending fatigue resistance without impairing gas-barrier property and solvent resistance inherent in PVA-based resin and use thereof.

Means for Solving the Problems

A resin composition of the present invention comprises (A) polyvinyl alcohol-based resin containing a structural unit represented by following formula (1), (B) fluororesin containing a polar functional group capable of reacting with or forming hydrogen bond(s) with hydroxyl group (hereinafter, referred to as "polar functional group-containing fluororesin (B)"). In the formula below, each of $R^1$-$R^6$ is independently hydrogen or an organic group, and X is single bond or a binding chain.

[formula 1]

(1)

The polar functional group is preferably a carbonyl-containing group or hydroxyl group. The carbonyl-containing group is preferably at least one selected from the group consisting of carbonate group, haloformyl group, aldehyde group, ketone group, carboxyl group, alkoxycarbonyl group, carboxylic anhydride group and isocyanate group.

The polar functional group-containing fluororesin (B) is preferably a copolymer containing at least tetrafluoroethylene unit as a constituent monomer unit thereof, more preferably a copolymer further containing ethylene unit as a constituent monomer unit thereof.

Preferably, fluororesin constituting the polar functional group-containing fluororesin (B) is one selected from the group consisting of ethylene/tetrafluoroethylene-based copolymer, ethylene/tetrafluoroethylene/hexafluoropropylene-based copolymer, ethylene/tetrafluoroethylene/$CH_2$=CH—Rf-based copolymer (where Rf is perfluoroalkyl group having from 2 to 6 carbon atoms), and ethylene/tetrafluoroethylene/hexafluoropropylene/$CH_2$=CH—Rf-based copolymer (where Rf is perfluoroalkyl group having from 2 to 6 carbon atoms). A preferred polar functional group-containing fluororesin (B) has a melting point of 120 to 220° C.

A preferred mass ratio (A/B) of the contents of the polyvinyl alcohol-based resin (A) to the polar functional group-containing fluororesin (B) ranges from 98/2 to 2/98.

According to another aspect of the invention, a producing method of a resin composition comprises a process of melt-kneading (A) polyvinyl alcohol-based resin containing a structural unit represented by the above formula (1) and (B) fluororesin containing a polar functional group capable of reacting with or forming hydrogen bond(s) with hydroxyl group.

According to yet another aspect of the invention, pellet and emulsified dispersion using the resin composition of the invention are included. The present invention further includes a melt-molded article and binder.

Effect of the Invention

Since the resin composition of the present invention contains not only (A) PVA-based resin that is melt-moldable but also (B) fluororesin containing a polar functional group capable of reacting with or forming hydrogen bond(s) with the PVA-based resin, the resin composition has flexibility such as bending fatigue resistance without impairing gas-barrier property or solvent resistance inherent in PVA-based resin.

MODES FOR CARRYING OUT THE INVENTION

The following description with respect to elements relates to one embodiment (typical embodiment) of the present invention and the invention is not limited to the description.

<Resin Composition>

A resin composition of the present invention comprises (A) polyvinyl alcohol-based resin containing 1,2-diol structural unit at side chain thereof (referred to as "side chain 1,2-diol-containing PVA-based resin"), and (B) fluororesin containing a polar functional group (referred to as "polar functional group-containing fluororesin"). Each component will be described below.

[(A) Side Chain 1,2-Diol-Containing PVA-Based Resin]

The side chain 1,2-diol-containing PVA-based resin used for the invention is a polyvinyl alcohol-based resin containing 1,2-diol unit at side chain thereof represented by the following formula (1).

[formula 1]

In the above formula (1), $R^1$ to $R^6$ each independently represents hydrogen or an organic group. All of $R^1$ to $R^6$ are preferably hydrogen, however, $R^1$ to $R^6$ each may be an organic group within an amount such that the properties of the resulting resin are not considerably impaired. The organic group includes, without limitation, alkyl group having 1-4 carbon atoms such as methyl, ethyl, n-propyl, isopropyl, n-butyl, isobutyl, and tert-butyl, and optionally may have a substituting group such as halogen, hydroxyl group, ester, carboxylic acid group, or sulfonic acid group.

In the above formula (1), X is single bond or a binding chain, preferably single bond due to increase of crystallinity or decrease of free volume (intermolecular void size) in amorphous portion. The binding chain include, without limitation, hydrocarbon such as alkylene, alkenylene, alkynylene, phenylene, and naphthylene (these hydrocarbon may be substituted by halogen such as fluorine, chlorine, bromine and so on), as well as —O—, —($CH_2$O)m-, —(O$CH_2$)m-, —($CH_2$O)m$CH_2$—, —CO—, —COCO—, —CO($CH_2$)mCO—, —CO($C_6H_4$)CO—, —S—, —CS—, —SO—, —$SO_2$—, —NR—, —CONR—, —NRCO—, —CSNR—, —NRCS—, —NRNR—, —$HPO_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O— (where each R is independently an intended substituting group, preferably hydrogen or an alkyl group, and m is a natural number). Of these, the binding chain is preferably alkylene having 6 or less carbon atoms, particularly preferably methylene or —$CH_2$O$CH_2$—, from the viewpoint of viscosity stability or thermostability in production thereof.

The most preferable 1,2-diol structural unit of the formula (1) is a structural unit where all of $R^1$ to $R^6$ are hydrogen and X is single bond, namely a structural unit represented by the following structural formula (1a).

[formula 1a]

(1a)

The side chain 1,2-diol-containing PVA-based resin having above-mentioned structure enables to bind to the component (B) by reacting and/or hydrogen bonding between polar functional group of the component (B) and side chain 1,2-diol unit, i.e. OH group of the side chain, and thereby enhancing affinity between the component (A) and the component (B). The enhancement of affinity between the components (A) and (B) means that the polar functional group-containing fluororesin is able to disperse finely in side chain 1,2-diol-containing PVA-based resin as a matrix component, and vice versa. A conventional PVA-based resin without side chain 1,2-diol unit exhibits poor reactivity with polar functional group in the component (B) regardless that many hydroxyl groups are contained therein, because the OH groups in the conventional PVA-based resin are all secondary one while the PVA-based resin as the component (A) has primary hydroxyl groups in side chain 1,2-diol unit which is likely to be more reactive with the polar functional group. Additionally, a resin composition employing a conventional PVA-based resin is difficult in achieving uniform dispersion.

Such side chain 1,2-diol-containing PVA-based resin is prepared by the following method, but not limited to,
(i) a method of copolymerizing vinyl ester-based monomer and a compound represented by the following formula (2), followed by saponification of the resulting copolymer;
(ii) a method of copolymerizing vinyl ester-based monomer and vinyl ethylene carbonate represented by the following formula (3), followed by saponifying and decarboxylating the resulting copolymer; and
(iii) a method of copolymerizing vinyl ester-based monomer and 2,2-dialkyl-4-vinyl-1,3-dioxolane represented by the following formula (4), followed by saponifying and deketalizing the resulting copolymer.

[formula 2]

(2)

[formula 3]

(3)

[formula 4]

(4)

In the formulas (2), (3), and (4), $R^1$ to $R^6$ each is identical to one in the formula (1). Each of $R^7$ and $R^8$ is independently hydrogen or $R^9$—CO— (where $R^9$ is an alkyl group having from 1 to 4 carbon atoms). Each of $R^{10}$ and $R^{11}$ is independently hydrogen or an organic group.

The methods (i), (ii), and (iii) are described in, for example JP2006-95825A.

Of these methods, (i) is preferred because of excellent copolymerization reactivity and industrial handling. In the method (i), 3,4-diacyloxy-1-butene, which is a compound where all of $R^1$ to $R^6$ are hydrogen, X is single bond, $R^7$ and $R^8$ are $R^9$—CO— where $R^9$ is an alkyl group, is preferably used, inter alia 3,4-diacetoxy-1-butene which is a compound where $R^9$ is methyl group is preferably used.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. Of these, vinyl acetate is preferably used from the viewpoint of economics.

Besides the above-listed monomers (i.e. vinyl ester-based monomer and compounds represented by the formulas (2) to (4)), the following compound may be copolymerized in an amount of not inhibiting gas-barrier property, usually 10 mol % or less, preferably 5 mol % or less. Examples of the copolymerizable compound include α-olefins such as ethylene and propylene; hydroxy group-containing α-olefins such as 3-buten-1-ol and 4-penten-1-ol; vinylene carbonates; unsaturated acids such as acrylic acid or salt thereof, mono- or di-alkyl ester thereof; nitriles such as acrylonitrile; amides such as methacrylamide; and olefin sulfonic acids such as ethylene sulfonic acid, allyl sulfonic acid, methallyl sulfonic acid, or salt thereof. In particular, ethylene is preferred because ethylene is able to form a eutectic with vinyl alcohol structural unit.

Copolymerization of vinyl ester-based monomer with a compound represented by the above formula (2), (3) or (4) may be performed by any known polymerization process, for example, solution polymerization, suspension polymerization, or emulsion polymerization.

Of these processes, solution polymerization under reflux can remove excess heat efficiently, and is preferably employed. The solvent for the solution polymerization typically employs alcohol, preferably lower alcohol having from 1 to 3 carbon atoms.

Thus obtained copolymer is saponified by a saponification process conventionally known in PVA-based resin field. The saponification is conducted such that the copolymer being dissolved in alcohol or water/alcohol solvent is saponified in the presence of alkali catalyst or acid catalyst. As the alkali catalyst, alkali metal hydroxide such as potassium hydroxide and sodium hydroxide, or alcoholate such as sodium methylate, sodium ethylate, potassium methylate and lithium methylate, may be used.

Preferred saponification temperature is from 20° C. to 60° C. Unduly low temperature causes a slow reaction and thereby lowering reaction efficiency. Unduly high temperature may reach to a temperature higher than the boiling point of the reaction solvent, which lowers safety in production. A saponification may be conducted with a pressure resistant continuous saponification tower or a like apparatus under a higher pressure and higher temperature such as 80 to 150° C. In this case, high saponification degree is achieved even if the saponification is conducted for a short time period in the presence of small amount of saponification catalyst.

The polymerization degree of the side chain 1,2-diol-containing PVA-based resin is usually 250 to 1000, preferably 300 to 700, more preferably 400 to 600. Unduly high polymerization degree gives an excessively high melt viscosity which causes excessive load to extruder during melt-kneading. As a result, the resin temperature would be elevated during melt-kneading due to shear heating, resulting in deterioration of the resin. On the other hand, unduly low polymerization degree provides a fragile molded product which is easily cracked and lowered in gas-barrier property.

The saponification degree of vinyl ester part of the side chain 1,2-diol-containing PVA-based resin is usually 98 to 100 mol %, preferably 99 to 100 mol %, more preferably 99.5 to 99.9 mol %, according to the measurement of JIS K6726. Unduly low saponification degree may lower gas-barrier property due to small content of OH groups, however, a highly saponified or completely saponified PVA-based resin tends to become difficult in industrial production.

The content of the structural unit represented by the formula (1), namely, the content of the side chain 1,2-diol structural unit is in the range of usually 2 to 20 mol %, preferably 4 to 15 mol %, more preferably 5 to 12 mol %, based on moles of all constituent monomers of the PVA-based resin. The melting point or the degree of crystallization is lower with increase of the content of the side chain 1,2-diol structural unit. Therefore a higher content is preferred in the point of improvement of melt-molding property in extruding, but tends to lower the productivity of the PVA-based resin. On the other hand, the content is too low, the side chain 1,2-diol-containing PVA-based resin is close to a non-modified PVA-based resin, and therefore becomes difficult in melt-molding. In addition, reaction point or formation of hydrogen bond with the component (B) or the polar functional group-containing fluororesin is lowered with decrease of the content of the side chain 1,2-diol structural unit, resulting in lowering dispersibility of the component (B) in the resin composition.

[(B) Polar Functional Group-Containing Fluororesin]

A polar functional group-containing fluororesin used for the present invention is a fluorine-based polymer where fluororesin is modified with a polar functional group capable of reacting with or forming hydrogen bond(s) with hydroxyl group.

The polar functional group is a group capable of reacting with or forming hydrogen bond(s) with hydroxyl group, and is preferably carbonyl-containing group or hydroxyl group, and more preferably carbonyl-containing group.

A preferred carbonyl-containing group is at least one selected from the group consisting of carbonate group, haloformyl group, aldehyde group (including formyl group), ketone group, carboxyl group, alkoxycarbonyl group, carboxylic anhydride group, and isocyanate group. Carbonate group, fluoroformyl group, carboxyl group, methoxycarbonyl group, ethoxycarbonyl group, and carboxylic anhydride group are more preferred, and carboxylic anhydride group is the most preferred.

A preferred fluororesin to be used for the polar functional group-containing fluororesin is fluorine-based copolymer containing at least tetrafluoroethylene as a constituent monomer unit. The fluororesin may further contain, as a copolymerized monomer, another fluorine-containing vinyl monomer such as hexafluoropropylene, vinylidene fluoride, perfluoro(alkyl vinyl ether), "FAE" monomer represented by $CH_2=CX(CF_2)_nY$ (X and Y are independently fluorine or hydrogen, and n is an integer of 2 to 10), as well as olefin-based vinyl monomer such as ethylene, propylene, vinyl ether, and vinyl ester, and another halogen-containing vinyl monomer.

A preferred FAE monomer has n of preferably 2 to 8, more preferably 2 to 6, further more preferably 2, 4, and 6. FAE monomer with n less than 2 may cause a molded article from the resulting resin to lower heat resistance or stress cracking resistance. FAE monomer with n more than 10 may become insufficient in polymerization reactivity. FAE monomer with n of 2 to 8 has good polymerization reactivity, and may provide a molded article with an enhanced heat resistance and stress cracking resistance. One or more kinds of FAE monomer may be copolymerized. Examples of the FAE monomer include $CH_2=CH(CF_2)_2F$, $CH_2=CH(CF_2)_4F$, $CH_2=CH(CF_2)_6F$, and $CH_2=CF(CF_2)_3H$. $CH_2=CH—Rf$ wherein Rf is perfluoroalkyl group having from 2 to 6 carbon atoms is most preferred.

Examples of the fluororesin include tetrafluoroethylene/perfluoro(alkyl vinyl ether)-based copolymer, tetrafluoroethylene/hexafluoropropylene-based copolymer, tetrafluoroethylene/perfluoro(alkyl vinyl ether)/hexafluoropropylene-based copolymer, ethylene/tetrafluoroethylene-based copolymer, ethylene/chlorotrifluoroethylene-based copolymer, ethylene/tetrafluoroethylene/hexafluoropropylene-based copolymer, ethylene/tetrafluoroethylene/$CH_2=CH$—Rf-based copolymer (Rf is perfluoroalkyl group having from 2 to 6 carbon atoms), and ethylene/tetrafluoroethylene/hexafluoropropylene/$CH_2=CH$—Rf-based copolymer (Rf is perfluoroalkyl group having from 2 to 6 carbon atoms).

A preferred fluororesin contains ethylene unit as a copolymerized monomer, is preferably one selected from the group consisting of ethylene/tetrafluoroethylene-based copolymer, ethylene/tetrafluoroethylene/hexafluoropropylene-based copolymer, ethylene/tetrafluoroethylene/$CH_2=CH$—Rf-based copolymer (Rf is perfluoroalkyl group having from 2 to 6 carbon atoms), and ethylene/tetrafluoroethylene/hexafluoropropylene/$CH_2=CH$—Rf-based copolymer (Rf is perfluoroalkyl group having from 2 to 6 carbon atoms). Further more preferred fluororesin is ethylene/tetrafluoroethylene/hexafluoropropylene-based copolymer ("E/TFE/HFP-based copolymer") or ethylene/tetrafluoroethylene-based copolymer ("E/TFE-based copolymer"), wherein "E" represents ethylene, "TFE" represents tetrafluoroethylene, and "HFP" represents hexafluoropropylene.

In order to improve stress cracking resistance or secure a high productivity of fluororesin, it is preferable that a comonomer represented by $CH_2=CH$—Rf (Rf is perfluoroalkyl group having from 2 to 6 carbon atoms) may be copolymerized in E/TFE-based copolymer or E/TFE/HFP-based copolymer. The most preferable $CH_2=CH$—Rf has Rf of 4 carbon atoms.

Introduction of polar functional group into the fluororesin may be performed by a method of copolymerizing vinyl monomer having polar functional group with fluorine-containing vinyl monomer such as TFE and HFP for production of the polar functional group-containing fluororesin; a method of polymerizing fluorine-containing vinyl monomer in the presence of polymerization initiator or chain transfer agent each having polar functional group and thereby introducing the polar functional group into a terminal of the obtained fluororesin; a method of mixing vinyl monomer having polar functional group with fluororesin and thereafter conducting irradiation; or a method of mixing vinyl monomer having polar functional group, fluororesin, and a radical initiator, and then melt-extruding the mixture to obtain fluororesin graft polymerized with a vinyl comonomer unit having polar functional group. Of these methods, a method of copolymerizing a fluorine-containing vinyl monomer and a monomer having polar functional group, for example, copolymerizing itaconic anhydride and citraconic anhydride as described in JP2004-238405A, is preferred.

Examples of the vinyl monomer having polar functional group include a monomer providable carboxylic anhydride group such as maleic anhydride, itaconic anhydride, citraconic anhydride and 5-norbornene-2,3-dicarboxylic anhydride (also called bicyclo[2.2.1]hept-2-ene-5,6-dicarboxylic anhydride); a monomer providable carboxyl group such as acrylic acid, methacrylic acid, maleic acid, fumaric acid, itaconic acid, citraconic acid, crotonic acid, bicyclo[2.2.1] kept-2-ene-5,6-dicarboxylic acid, $CF_2=CFOCF_2CF_2CF_2COOH$, $CF_2=CFOCF_2CF(CF_3)OCF_2CF_2COOH$ and $CH_2=CHCF_2CF_2CF_2COOH$, and alkyl ester thereof such as methyl ester or ethyl ester, and alkaline metal salt or ammonium salt thereof.

Examples of the polymerization initiator having polar functional group include peroxide having peroxycarbonate group, and peroxide having peroxyester. Peroxide having peroxycarbonate group is more preferably used. Preferable examples of the peroxide having peroxycarbonate group include diisopropyl peroxy carbonate, di-n-propyl peroxydicarbonate, t-butyl peroxy isopropyl carbonate, bis(4-t-butylcyclohexyl)peroxy dicarbonate, and di-2-ethylhexyl peroxydicarbonate.

Examples of the chain transfer agent having polar functional group include alcohol such as methanol, ethanol, propanol and butanol, and carboxylic acid such as acetic anhydride, thioglycolic acid, and thioglycol.

The content of the polar functional group in the component (B) (polar functional group-containing fluororesin) is calculated by the formula: number of moles of polar functional group/number of moles of fluororesin constituent monomer)×100. The content is in the range of preferably 0.01 to 10 mol %, more preferably 0.05 to 5 mol %, most preferably 0.1 to 3 mol %. Unduly small content of the functional group makes the component (B) difficult to be finely dispersed due to relatively lowered affinity to the component (A). As a result, it is hard to obtain uniform resin composition. That it to say, a sea-island structure where the component (B) exists as fine islands is not easily formed, which causes less improved bending fatigue resistance as well as generation of voids or aggregates resulting in lowering gas-barrier property as an advantage of the PVA-based resin. To make matters worse, emulsification dispersibility of the composition in water and binder properties are impaired, which is unpreferable.

A melting point of the polar functional group-containing fluororesin used for the present invention is preferably from 120 to 220° C., more preferably from 150 to 210° C., further more preferably from 170 to 190° C. In case that the melting point is too higher than that of the component (A) as a main component of the resin composition, the resin composition requires to set a melting temperature for its production at a higher temperature such as 250 to 290° C., which causes unpreferable deterioration of PVA-based resin or color deterioration. In general, if the content of polar functional group falls in the above-mentioned range, the resulting polar functional group-containing fluororesin satisfies the above-mentioned range of melting point.

A volume flow rate (hereinafter called as "Q value") of the fluororesin used for the component (B) is from 0.1 to 1000 mm³/s, preferably 1 to 500 mm³/s, more preferably 2 to 200 mm³/s. Q value is an index indicating melt flowability of the resin which is an indicator for melt-molding fluororesin. Also Q value gives an indication of molecular weight. A large Q value indicates low molecular weight, and small Q value indicates high molecular weight. The Q value is an extrusion rate of the resin when extruding into the orifice having 2.1 mm in diameter and 8 mm in length under a load of 7 kg at a temperature 50° C. higher than the melting point of the fluororesin, and is measured with a flow tester from Shimadzu Corporation. Unduly small Q value makes difficult in extrusion molding of the fluororesin, to the contrary, unduly large Q value lowers mechanical strength of the fluororesin.

A method of producing such a polar functional group-containing fluororesin (B) is not particularly limited. A typical method comprises feeding fluorine-containing vinyl monomer and another comonomer into a reactor, and copolymerizing them with a typical radical polymerization initiator and chain transfer agent. Examples of the polymerization process are as follows: a known bulk polymerization process; solution polymerization process with use of an organic solvent such as fluorohydrocarbon, chlorohydrocarbon, fluorinated chlorinated hydrocarbon, alcohol, and hydrocarbon as a polymerization medium; suspension polymerization process with use of an aqueous medium and an optionally proper organic solvent as a polymerization medium; and emulsion polymerization process with use of an aqueous medium as polymerization medium and emulsifier. Solution polymerization process is most preferred. Such polymerization processes may be conducted in batch or continuous operation with use of single- or multi-vessel type polymerization apparatus with stirrer, or tubular polymerization apparatus.

For the radical polymerization initiator, an initiator having half-life of 10 hours and initiating temperature of 0 to 100° C. (preferably 20 to 90° C.) is preferably used. Examples of such radical polymerization initiator include azo compound such as azobisisobutyronitrile; peroxydicarbonate such as diisopropyl peroxydicarbonate; peroxyester such as tert-butyl peroxypivalate, tert-butyl peroxyisobutyrate and tert-butyl peroxyacetate; non-fluorinated diacyl peroxide such as isobutyryl peroxide, octanoyl peroxide, benzoyl peroxide and lauroyl peroxide; fluorinated diacyl peroxide such as $(Z(CF_2)_pCOO)_2$, wherein Z is hydrogen, fluorine or chlorine, p is integer of 1 to 10; and inorganic peroxide such as potassium persulfate, sodium persulfate and ammonium persulfate.

For the polymerization medium, as mentioned above, organic solvents such as fluorohydrocarbon, chlorohydrocarbon, fluorinated chlorinated hydrocarbon, alcohol, and hydrocarbon, or aqueous medium may be used.

For the chain transfer agent, alcohols such as methanol and ethanol; chlorofluorohydrocarbons such as 1,3-dichloro-1,1,2,2,3-pentafluoropropane and 1,1-dichloro-1-fluoroethane; hydrocarbons such as pentane, hexane and cyclohexane; or fluorinated hydrocarbons such as 1-hydrotridecafluorohexane may be used.

The condition of the polymerization process is not particularly limited to, but a preferred polymerization temperature is usually from 0 to 100° C., preferably from 20 to 90°

C., and preferred polymerization pressure is from 0.1 to 10 MPa, preferably from 0.5 to 3 MPa. A preferred polymerization time is usually from 1 to 30 hours, preferably from 2 to 10 hours, depending on the polymerization temperature, polymerization pressure, and so on.

[(C) Other Additives]

In addition to the (A) side chain 1,2-diol-containing PVA-based resin and (B) polar functional group-containing fluororesin, the resin composition of the invention may further comprise, according to necessity, a conventionally known PVA-based resin without side chain 1,2-diol unit, cellulose derivatives such as carboxy ethyl cellulose, other water-soluble polymer such as polymethacrylic acid and polyacrylic acid; fluororesin containing without polar functional group; other thermoplastic resin such as polyamide, polyester, polyethylene, and polypropylene, to the extent that does not inhibit the effect of the invention, for example, at most 5 mass % based on the total mass of the resin composition.

And moreover, plasticizer such as ethylene glycol, glycerin, hexanediol or the like aliphatic polyalcohol; lubricant such as saturated aliphatic amide (e.g. stearamide), unsaturated fatty acid amide (e.g. amide oleate), bis-fatty acid amide (e.g. ethylene bis stearamide), low molecular weight polyolefin (e.g. low molecular weight polyethylene or low molecular weight polypropylene each having a molecular weight of about 500 to about 10000); antiblocking agent; antioxidant; colorant; antistatic agent; ultraviolet absorber; insecticide; insoluble inorganic salt (e.g. hydrotalcite); filler (e.g. inorganic filler); oxygen scavenger (e.g. ring-opened polymer of cycloalkenes such as polyoctenylene, cyclized product of conjugated diene polymer such as butadiene); surfactant, wax; dispersing agent (e.g. stearic acid monoglyceride), thermal stabilizer, light stabilizer, drying agent, flame retardant, crosslinking agent, curing agent, foaming agent, crystal nucleating agent, anti-fogging agent, biodegradable agent, silane coupling agent, conjugated polyene compound, or the like known additive may be added.

<Preparation of Resin Composition>

The resin composition of the invention is prepared by mixing the (A) side chain 1,2-diol-containing PVA-based resin, (B) polar functional group-containing fluororesin, and (C) an optional additive in a given amount respectively.

The mass ratio (A/B) in terms of the contents of (A) side chain 1,2-diol-containing PVA-based resin to (B) polar functional group-containing fluororesin in the resin composition of the invention is usually from 98/2 to 2/98, preferably 98/2 to 30/70, more preferably 95/5 to 40/60, further more preferably 90/10 to 50/50. Unduly high content of the component (A) provides a fragile molded product having poor durability, poor bending fatigue resistance and poor stretchability. When the content ratio is from 98/2 to 30/70, the resin composition is able to give a molded product with excellent gas-barrier property because the side chain 1,2-diol-containing PVA-based resin (A) is present as matrix in the resin composition. When the content ratio (A/B) is from 29/71 to 2/98, the polar functional group-containing fluororesin (B) is present as matrix in the resin composition, and the fluororesin (B) matrix is given excellent gas-barrier property.

The resin composition of the present invention has a ratio $(\eta_A/\eta_B)$ of melting viscosities at 220° C. and shear rate 122 $sec^{-1}$ of (A) side chain 1,2-diol-containing PVA-based resin to (B) polar functional group-containing fluororesin is usually in the range from 1/5 to 5/1, preferably from 1/3 to 3/1, more preferably from 1/2.5 to 2/1. If the melting viscosity ratio is too large or too small, the resin composition is difficult to be uniformly mixed by melt-kneading. In short, melting viscosities of (A) side chain 1,2-diol-containing PVA-based resin and (B) polar functional group-containing fluororesin are favorably close to each other.

The side chain 1,2-diol structural unit of the side chain 1,2-diol-containing PVA-based resin and polar functional group of the polar functional group-containing fluororesin may react or form hydrogen bonds in the resin composition having thus composition mentioned above, thereby achieving a high affinity between the component (A) and the component (B). The resin composition has a sea-island structure in which polar functional group-containing fluororesin disperses in the form of island as fine as 1 μm or less in the sea of the side chain 1,2-diol-containing PVA-based resin as matrix, and vice versa. Accordingly, the molded article such as film and coating obtained from the resin composition, in particular, the molded product made from the resin composition having matrix of the PVA-based resin, exhibits excellent gas-barrier property and electrochemical stability both inherent in PVA-based resin. Additionally, external force or stress may be absorbed by dispersion phase (i.e. domains) of polar functional group-containing fluororesin, and moreover the stress may be relaxed by craze formation at interfaces between the matrix of the side chain 1,2-diol-containing PVA-based resin and the domain of the polar functional group-containing fluororesin. As a result, the flexibility and bending fatigue resistance of the PVA-based resin would be reduced. Furthermore, since also the polar functional group-containing fluororesin has solvent resistance inherent in fluororesin, the excellent solvent resistance inherent in PVA-based resin is not impaired, and therefore a molded product from the resin composition is expected to exhibit excellent solvent resistance.

A mixing operation of the components (A) and (B) is performed by dryblend, melt-kneading, or mixing solutions, preferably melt-kneading.

A melt-kneading apparatus such as kneading machine, extruder, mixing roll, banbury mixer, kneader-ruder, or plastmill may be used, in particular, extruder is preferably used because the extruder allows continuous operations and gives improved mixing efficiency.

Each of a single screw extruder and twin screw extruder may be used, preferably a twin screw extruder, particularly having two screws rotating the same directions because sufficient mixing is achieved by an appropriate shear force.

The extruder has L/D of usually 10 to 80, preferably 15 to 75, more preferably 15 to 70. Unduly low L/D causes insufficient melt-kneading, and may make insufficiently uniform dispersion. On the other hand, unduly high LID may be liable to bring about polymer decomposition by shear heating caused from excess shear or excess stagnation.

The screw rotation speed is usually selected from the range from 10 to 400 rpm, preferably from 30 to 300 rpm, more preferably from 50 to 250 rpm. Unduly low rotation speed causes to be unstable discharge, and unduly high rotation speed may allow the resin deteriorated by shear heating.

The temperature of the resin composition for melting in extruder is usually from 170 to 260° C., preferably from 180 to 240° C., more preferably from 190 to 235° C. In case that the temperature of the resin composition in the extruder is too high, the reaction between (A) side chain 1,2-diol-containing PVA-based resin and (B) polar functional group-containing fluororesin is excessively advanced to generate gel. In case that the temperature of the resin composition in the extruder is too low, melt-kneading as well as dispersibility of the (B) polar functional group-containing fluororesin is liable to be insufficient.

The temperature of the resin composition may be generally controlled by appropriately setting a temperature of the cylinder in extruder and rotation speed.

Thus prepared resin composition of the invention is allowed to be melt-molded. For using as a molding material, the resin composition is typically formed in pellet or powder. Pellet form is preferred in the point of feeding into a molding machine, handling associated with a molding machine and less generation of fine powder.

The resin composition is formed into pellet by a known method. A preferable effective method is that a strand-like resin composition is extruded from the extruder described above, cooled and cut in a proper length, to obtain cylindrical pellets. Cooling may be carried out by allowing the PVA-based resin (A) to contact organic solvent such as alcohol-based solvent undissolving the PVA-based resin at low temperature, or by blowing cold air. Cooling with cold air is favorable in the point of environment and safety.

Size and shape of the pellet are not limited, but typical pellet may have a cylindrical or spherical shape. Cylindrical shape with diameter of 1 to 6 mm, length of 1 to 6 mm, and spherical shape with diameter of 1 to 5 mm are favorable. Small-sized pellet with diameter of 1 to 2 mm and length of 1 to 2.5 mm are preferably used due to the efficiency of emulsification in water descried later.

Pellet having nearly spherical form are obtained by cutting in air or organic solvent, while the PVA-based resin (A) is under still being melted after extrusion from the extruder.

<Use>

The PVA-based resin having above-mentioned composition is melt-moldable, and gives a molded product having excellent gas-barrier property and solvent resistance, as well as enhanced bending fatigue resistance. Accordingly, a resulting molded article is usable for a wrapping material or container for various food and beverage, bag for bag-in-box, packaging container for organic liquid including drug or the like medicine, chemical product, and so on.

A melt-molded article from the PVA-based resin composition of the invention has a surface free energy less than a melt-molded article from side chain 1,2-diol-containing PVA-based resin alone. Accordingly, melt-molded article, particularly film can suppress sticking each other, which is expected that a melt-molded film is easily rolled up under room temperature and normal humidity. This is advantage in industrial production.

Furthermore, the PVA-based resin composition of the invention may be used in the field requiring enhanced solvent resistance as a wrapping material, for example, used as a wrapping material for various battery parts, surface protective layer of magnet containing rare metal, sealing film for organic EL, and so on.

Besides the use as a molded article, the resin composition of the invention may be also used for emulsified dispersion in which fluororesin is emulsificated and dispersed.

<Emulsified Dispersion>

An emulsified dispersion of the present invention is a liquid where the inventive resin composition is dissolved or dispersed in a dispersion medium dissolving or uniformly miscible with PVA-based resin. According to the invention, the emulsified dispersion comprises (A) polyvinyl alcohol-based resin containing a structural unit represented by the following formula (1); (B) fluororesin containing a polar functional group capable of reacting with or forming hydrogen bond(s) with hydroxyl group; and a dispersion medium dissolving or uniformly miscible with the polyvinyl alcohol-based resin (A).

[formula 1]

In the formula, $R^1$-$R^6$ each represents independently hydrogen or an organic group, and X represents single bond or a binding chain.

According to the invention, the same kind of side chain 1,2-diol-containing PVA-based resin for the component (A) and polar functional group-containing fluororesin for the component (B) as those described in the resin composition may be used respectively. According to a preferred embodiment of the invention, it is preferably used that a pellet of the resin composition in which the component (A) exists as matrix and the component (B) is dispersed in the matrix, specifically a resin composition pellet has a mixing ratio of the component (A) and the component (B), i.e. A:B (mass ratio) of 95:5 to 55:45, preferably 90:10 to 60:40, more preferably 85:15 to 60:40, particularly preferably 80:20 to 65:35.

A liquid uniformly miscible with PVA-based resin, or dissolving PVA-based resin may be used for the dispersion medium. The liquid for the dispersion medium is at least one selected from the group consisting of water, a mixed solution of water and alcohol, and amide-based solvent. Examples of the amide-based solvent include N-methylpyrrolidone (NMP), dimethylformamide, dimethylacetamide, and methylformamide.

In the case of water/alcohol mixed solution, lower alcohol such as methanol, ethanol, isopropanol, and n-propyl alcohol may be used for the alcohol. The mixing ratio of water to alcohol, i.e. water/alcohol, is selected from usually 100/0 to 40/60, preferably 90/10 to 50/50, more preferably 85/15 to 60/40. Unduly high content of alcohol may cause insufficient emulsification dispersibility, and lowered preservation stability of the emulsion, and elevated viscosity of the emulsion, which make difficult in handling the emulsion.

In the resin composition of the invention, a product by reacting or forming hydrogen bonds between the hydroxyl group (specifically primary hydroxyl group) of (A) side chain 1,2-diol-containing PVA-based resin and the polar functional group (preferably carboxyl group) of (B) polar functional group-containing fluororesin can act as a compatibilizing agent, as a result, the fluororesin (B) is finely dispersed in the PVA-based resin (A) matrix. For this reason, when the resin composition is mixed with a liquid dissolving or uniformly miscible with PVA-based resin (i.e. dispersion medium), the side chain 1,2-diol-containing PVA-based resin existed as matrix (i.e. sea part) is dissolved in the liquid or dispersion medium to become an emulsion. In the resultant emulsion, the polar functional group-containing fluororesin (B) existed as island parts in the resin composition is dispersed in the dispersion medium, and the product obtained by the reaction or forming hydrogen bond(s) between the hydroxyl group (specifically primary hydroxyl group) of the PVA-based resin (A) and polar functional group (preferably carboxyl group or carboxylic anhydride group) of the fluororesin (B) can make a role of protective colloid. In general, it is impossible to disperse fluororesin alone in water, water/alcohol mixed solution, amide-based solvent or the like dispersion medium, however, the fluororesin can exist stably in the presence of the side chain 1,2-diol-containing PVA resin. It is supposed that the product of the reaction with the side chain 1,2-diol-containing PVA resin might surround and/or enclose the (B) polar functional group-containing fluororesin to become stabilized spherical particles of the dispersant surrounded with the protective colloid.

The emulsified dispersion of fluororesin is prepared by mixing the resin composition pellet with dispersion medium, and stirring, preferably under heating according to needs.

The concentration of the resin composition to the total amount of emulsified dispersion, i.e. the solid content in the emulsified dispersion, is usually from 1 to 50 mass %, preferably from 3 to 45 mass %, more preferably from 7 to 40 mass %. Unduly high resin concentration is liable to relatively increase the viscosity of the emulsion. To the contrary, unduly low resin concentration is liable to lower the dispersion stability of the emulsified dispersion.

The solid content is measured according to loss-on-drying method.

Specifically, in the case of using water as dispersion medium, the concentration of the resin composition (solid content) is usually from 10 to 50 mass %, preferably 20 to 45 mass %, more preferably 30 to 40 mass %, based on the total mass of the emulsified dispersion. In the case of using amide-based solvent such as N-methylpyrrolidone as dispersion medium, the resin composition concentration (solid content) is usually from 1 to 50 mass %, preferably 3 to 20 mass %, more preferably 7 to 15 mass %, based on the total mass of the emulsified dispersion.

The heating temperature is usually selected from the range of 20 to 80° C., preferably 40 to 70° C., more preferably 50 to 68° C., but not limited thereto. A higher temperature is preferred because of shortening emulsification and dispersion time. The agitating time is usually selected from the range of 0.5 to 10 hours, preferably 1 to 7 hours, more preferably 1 to 5 hours.

In thus prepared emulsified dispersion, fluororesin and its protective colloid layer form a particle stably dispersed as a dispersoid having a diameter of usually 100 to 800 nm, preferably 300 to 700 nm, more preferably 400 to 600 nm.

Such emulsified dispersion may be used for producing a film of the resin composition, which contains a side chain 1,2-diol-containing PVA-based resin as matrix and a polar functional group-containing fluororesin as domain. Such film is produced by applying the emulsified dispersion on a substrate, heating and drying for removing (e.g. volatilizing or evaporating) the dispersion medium. The drying temperature is set at a temperature of room temperature to 150° C., preferably 60 to 130° C., more preferably 70 to 120° C.

The film made from the emulsified dispersion exhibits excellent solvent resistance, as well as durability against hydrogen fluoride. In addition, the film is insoluble and extremely reduced swellable in electrolyte solution of Li-ion secondary battery, including ethylene carbonate, propylene carbonate, diethyl carbonate, and dimethyl carbonate. And moreover, the film has heat resistance sufficient enough to meet a requirement for the film, such as heat resistance to 180 to 200° C. Accordingly, the resulting coat is preferably used as wrapping material, surface treatment agent for electrode or separator, and binder for electrode active material, used in Li-ion secondary battery.

<Binder>

A binder of the present invention comprises the earlier described inventive emulsified dispersion. That is, the binder comprises an emulsified dispersion comprising (A) side chain 1,2-diol-containing PVA-based resin; (B) fluororesin having a polar functional group capable of reacting with or forming hydrogen bond(s) with hydroxyl group; and a dispersion medium miscible with or dissolving the PVA-based resin (A). Such a binder is particularly suitable for lithium-ion secondary battery electrode.

In general, fluorine-based polymer such as PVDF is widely used for a binder for lithium-ion secondary battery electrode, because the fluorine-based polymer has excellent binding strength to an active material. The binder for lithium-ion secondary battery electrode needs such a binding strength to avoid the active material from separating or removing from a current collector even if the electrode is bent or curved. For meeting the needs, a binder containing fluorine-based polymer and conjugated diene-based polymer both dispersed in water is suggested in, for example, JP2002-231251A. However, with increasing demand of miniaturized, less thickened, and qualified lithium-ion secondary battery, a binder for electrode is also required to have superior solvent resistance, as well as stronger binding strength sufficient for keeping a current collector adhered to the electrode regardless of repeating bent or folded. Additionally, there is an increased demand of improving stability during repetitive charge/discharge cycles. A binder of the present invention may meet these demands.

Moreover, in recent years, there is a demand of an aqueous binder applicable to positive electrode active material such as phosphate-based positive electrode active material having olivine structure ($LiMPO_4$:M=Fe, Mn, Co, Ni etc.). Styrene-butadiene rubber (SBR) is generally used as a binder resin of a binder for negative electrode, however, the SBR binder is difficult to apply to the positive electrode in practice due to its insufficient electrochemical stability. PVDF which is typically used for a binder for positive electrode active material does not allow to employ water for a dispersion medium due to its poor affinity to water, and therefore PVDF may also be insufficient for durability including charge and discharge characteristics because PVDF is easy to swell in electrolyte solution. For these situations, a binder of the present invention is advantageous because the binder is applicable aqueous binder for a positive electrode active material.

Hereinafter, a binder of the invention will be described with a reference to a binder for lithium-ion secondary battery electrode, but it is not construed that the invention is limited to the description. The binder of the present invention is used for applications other than lithium-ion secondary battery electrode.

The binder for lithium-ion secondary battery electrode comprises a binding component comprising (A) side chain 1,2-diol-containing PVA-based resin, and (B) fluororesin having a polar functional group capable of reacting with or forming hydrogen bond(s) with hydroxyl group. Usually, the binder is prepared with use of the emulsified dispersion of the present invention as a raw material.

According to the invention, the side chain 1,2-diol-containing PVA-based resin and the polar functional group-containing fluororesin described for the resin composition may be used for the respective components (A) and (B).

Also, the identical solvent used for the emulsified dispersion may be employed as a dispersion medium. In other words, a solvent miscible with or dissolving the component (A), specifically at least one selected from the group consisting of water, mixed solution of water and alcohol, and amide-based solvent, may be used. Examples of the amide-based solvent include N-methylpyrrolidone (NMP), dimethylformamide, dimethylacetamide, and methylformamide. Lower alcohol such as methanol, ethanol, isopropanol, and n-propyl alcohol may be used for alcohol of the water/alcohol mixed solution.

The content of binder resin component in the binder corresponding to the total content of components (A) and (B), is from 1 to 60 mass %, preferably from 5 to 50 mass %, particularly preferably from 8 to 40 mass %. Accordingly, the content of the emulsified dispersion contained in the binder is properly set such that the content of the binder resin component falls in the above-mentioned range, taking account of the solid content of the emulsified dispersion.

The mixing ratio of the component (A) and the component (B) in the binder resin component is not particularly limited, but the mixing ratio is set such that the fluororesin as the component (B) is stably and finely dispersed with matrix of the PVA-based resin in dispersion medium. Specifically, the ratio (A:B) of (A) side chain 1,2-diol-containing PVA-based resin and (B) polar functional group-containing fluororesin is from 95:5 to 55:45, preferably 90:10 to 60:40, further preferably 85:15 to 60:40, particularly preferably 80:20 to 65:35.

In addition to the binder resin, the binder of the invention may contain a PVA-based resin other than the side chain 1,2-diol-containing PVA-based resin, and another water-soluble polymer, for adjusting the viscosity of the binder.

The PVA-based resin other than the side chain 1,2-diol-containing PVA-based resin include, for instance, unmodified PVA-based resin; carboxyl group-containing PVA-based resin; acetal compound of the PVA-based resin such as formalized PVA-based resin and butyralized PVA-based resin; urethanized PVA-based resin; PVA-based resin esterified with sulfonic acid or carboxylic acid; terminal thiol-modified PVA-based resin; silicon functional group-containing PVA-based resin; acetoacetyl group-containing PVA-based resin; oxyalkylene group-containing PVA-based resin such as oxyethylene group-containing PVA-based resin and oxypropylene group-containing PVA-based resin; saponified copolymer of α-olefin (e.g. ethylene, propylene)-containing PVA-based resin and a monomer copolymerizable with vinyl ester.

The water-soluble polymer other than the PVA-based resin include, for instance, cellulose derivatives such as methylcellulose, ethylcellulose, hydroxymethyl cellulose, hydroxypropyl methylcellulose, hydroxybutyl methylcellulose, hydroxyethyl cellulose, carboxymethyl cellulose, aminomethyl hydroxypropyl cellulose, aminoethyl hydroxypropyl cellulose; starch, tragacanth, pectin, glue and alginic acid, and salt thereof; gelatin; polyvinylpyrrolidone; polyacrylic acid and salt thereof, polymethacrylic acid and salt thereof; acrylamides such as polyacrylamide and polymethacrylamide; copolymer of vinyl acetate and unsaturated acid such as maleic acid, maleic anhydride, acrylic acid, methacrylic acid, itaconic acid, fumaric acid, and crotonic acid; copolymer of styrene and the foresaid unsaturated acid; copolymer of vinyl ether and the foresaid unsaturated acid; salt or ester of the foresaid copolymers each copolymerized with the unsaturated acid; polysaccharides such as carrageenan and xanthan gum. Of these, cellulose derivatives are preferably used.

Solid content in the binder corresponding to percentage of the total solid content contained in the binder, is usually selected from the range of 1 to 70 mass %, preferably 3 to 55 mass %, more preferably 5 to 50 mass, particularly preferably 8 to 40 mass %. The content is adjusted with taking account of active materials and their properties, as well as viscosity of slurry for electrode using the binder which is described later.

The binder of the present invention may be prepared by optionally admixing other resin and dispersion medium to the emulsified dispersion as a raw material, and adjusting appropriate concentration.

Specifically, the binder may be prepared by adding other resin and dispersion medium to the prepared emulsified dispersion; dissolving or dispersing a mixture of resin composition pellet and other resin in dispersion medium; or mixing emulsified dispersion with a solution containing other resin in dispersion medium.

The binder having such a composition may provide a coating having enhanced thermostability and solvent resistance as well as excellent flexibility and electrochemical stability, based on the properties of the binder resin components (i.e. PVA-based resin and polar functional group-containing fluororesin). Therefore, in case that the binder is used for binding between active materials or between active material and current collector, the binding portion can follow expansion and contraction of the electrode active material caused from repeating charging and discharging. Also the binder has excellent electrochemical stability. Accordingly, the binder can provide highly qualified electrode.

As described above, the binder is suitable for a binder for lithium-ion secondary battery electrode including positive electrode and negative electrode.

[Preparation of Slurry for Electrode, Production of Electrode and Lithium-Ion Secondary Battery]

(1) Preparation of Slurry for Electrode and Production of Electrode

Electrode for lithium-ion secondary battery is produced using a slurry liquid containing the above-mentioned binder, active material, and optional other components.

Examples of the positive electrode active material include olivine-type lithium metal phosphate represented by $LiMPO_4$ (M=Fe, Mn, Co, Ni etc.), lithium cobalt(III) oxide, lithium manganate, lithium nickel dioxide, lithium-nickel-cobalt-manganate, lithium-nickel-cobalt-aluminum complex oxide, and so on. The effect of the invention is likely to be obtained when the binder contains positive electrode active material, particularly olivine-type lithium metal phosphate.

Carbon material is preferably used for a negative electrode active material. Examples of the carbon material included graphite based carbon material (i.e. graphite) such as natural graphite, synthetic graphite, expanded graphite, carbon black, activated carbon, carbon fiber, coke, soft carbon, and hard carbon. Graphite such as natural graphite, synthetic graphite, and expanded graphite is more preferably used.

The active material had an average particle size of preferably 1 to 100 μm, more preferably 1 to 50 μm, further preferably 1 to 25 μm, but not limited thereto. The average particle size of the active material is a value measured by laser diffraction particle size measurement (laser diffraction/scattering method).

A content of the active material in the slurry is from 10 to 95 mass %, preferably 20 to 80 mass %, more preferably 35 to 65 mass %.

The content of the binder for electrode in the slurry is, in terms of solid content, usually from 0.1 to 10 mass parts, preferably 0.1 to 5 mass parts, particularly preferably 0.1 to 4 mass parts, based on 100 mass parts of the active material.

Unduly high content of the binder for electrode increases internal resistance. On the other hand, unduly low content of the binder is difficult to achieve desirable binding strength, as a result, the electrode becomes unstable, and the charging/discharging cycle property is lowered.

In addition to the active material and binder, the slurry for electrode may contain, other material including, for instance, conductive additive and ion-conducting polymer, and so on. These components are contained in generally known mixing ratios. The mixing ratio may be adjusted with referring to a common knowledge on lithium-ion secondary battery.

The conductive additive is blended for improving conductivity. Examples of the conductive additive include carbon powder such as graphite and acetylene black, carbon fiber such as vapor-grown carbon fiber (VGCF), or the like. The electrode of the present invention preferably contains a conductive additive when a polymer having relatively low conductivity is employed. In particular, in the case of using a binder employing polyvinyl alcohol, use of VGCF as the conductive additive may enhance the active material, thereby suppressing decrease of charge and discharge capacity due to a large amount of binder. The added amount of VGCF is preferably 1 to 10% by mass, based on the total mass of the active material layer.

In addition, for the purpose of adjusting viscosity or binder solid content for improving workability in production of the electrode, a solvent may be added to obtain a slurry for electrode. Examples of the solvent include N-methylpyrrolidone (NMP), amide-based solvent such as dimethylformamide, dimethylacetamide, methylformamide, alcohol-based solvent such as methanol, ethanol, and higher alcohol.

The binder for electrode, active material, and optionally blended additive and solvent may be mixed using a stirrer, deaerator, bead mill, high-pressure homogenizer, or the like. The slurry for electrode is preferably prepared under reduced pressure, thereby obtaining an active material layer with less foam.

Thus prepared slurry for electrode is applied over a current collector and dried to obtain an electrode. If necessary, press the coat after applying is favorable for increasing density.

As a current collector used for the negative electrode, a conventionally used current collector for negative electrode of the lithium-ion secondary battery may be employed. Copper or nickel in the form of metal foil, etching metal foil, expanded metal, and the like may be employed for the current collector, because they are electrochemically inert in the electric potential range in which negative electrode (carbon electrode) functions.

As a current collector for the positive electrode, metallic material including aluminum, copper, nickel, tantalum, stainless, titanium and the like may be appropriately employed, depending on types of the secondary battery device.

The slurry for the electrode is applied over each current collector, and dried to form electrode layer. As a coating process of the slurry for electrode on the current collector, doctor blade process, reverse roll process, comma bar process, gravure process, and air knife process may be employed. The coating is dried at a temperature of usually 20 to 250° C., preferably 50 to 150° C., for the time of usually 1 to 120 minutes, preferably 5 to 60 minutes.

The thickness of the active material layer (i.e. thickness of coating layer on one side) is usually 20 to 500 μm, preferably 20 to 300 μm, more preferably 20 to 150 μm.

(2) Lithium-Ion Secondary Battery

The lithium-ion secondary battery having an electrode thus produced will be described.

When at least one of positive electrode and negative electrode employs a binder of the invention for the active material, the lithium-ion secondary battery is included in the scope of the invention.

Aprotic polar solvent dissolving lithium salt is used for an electrolyte. Examples of the aprotic polar solvent, without limitation, include a solvent prepared by adding low viscosity solvent or lower chain carbonate (e.g. dimethyl carbonate, ethyl methyl carbonate, and diethyl carbonate) to cyclic carbonate ester-based solvent with high permittivity and high boiling point (e.g. ethylene carbonate and propylene carbonate). Specific examples of the aprotic polar solvent include ethylene carbonate, trifluoropropylene carbonate, butylene carbonate, diethyl carbonate, dimethyl carbonate, ethyl methyl carbonate, methyl propyl carbonate, isopropyl methyl carbonate, ethyl propyl carbonate, isopropyl ethyl carbonate, butyl methyl carbonate, butyl ethyl carbonate, dipropyl carbonate, 1,2-dimethoxyethane, α-butyrolactone, tetrahydrofuran, 2-methyltetrahydrofuran, sulfolane, 3-methylsulfolane, 2,4-dimethylsulfolane, 1,3-dioxolane, methyl acetate, ethyl acetate, methyl formate, and ethyl formate, which are preferably used in combination.

Addition of allyl ethyl carbonate, vinyl ethylene carbonate, vinylene carbonate, maleic anhydride, 2-vinylpyridine or vinyl acetate is preferred because such addition aids the generation of solid electrolyte interface (SEI) and decreases irreversible capacity.

Any compound generally used for an electrolyte of non-aqueous electrolyte solution, for instance, inorganic salt such as $LiClO_4$, $LiPF_6$, $LiBF_4$, $LiAsF_6$, LiCl, and LiBr; or organic salt such as $LiCF_3SO_3$, $LiN(SO_2CF_3)_2$, $LiN(SO_2C_2F_5)_2$, $LiC(SO_2CF_3)_3$, and $LiBC_4O_8$ may be used for a lithium salt for the electrolyte. Of these, $LiPF_6$, $LiBF_4$ or $LiClO_4$ is preferably used.

Non-woven fabric or porous film of polyolefin may be used for the separator, but not limited thereto.

Secondary battery has a structure of, without limitation, stacked type (flat type) or winding type (cylinder type). Any conventionally known form or structure may be employed. Moreover, internal parallel connection type and bipolar (internal series connection) type may be employed for electrical connection mode of the lithium-ion secondary battery.

EXAMPLE

Hereinafter, the present invention will be specifically described with examples, but it is understood that the present invention is not limited to the following examples.

Incidentally, the term "parts" as used herein, is on the mass basis unless otherwise indicated.

[Measurement Evaluation Method]

First, measurement and evaluation methods employed in examples will be described.

(1) Gas-Barrier Property (Oxygen Permeability)

Oxygen permeation (cc·30 μm/m²·day·atm) of film is measured under the condition of 80% RH at 23° C. using oxygen transmission rate testing machine ("OxtranTwin" from MOCON, INC.).

(2) Solvent Resistance

A strand obtained under the process of melt-kneading or pelletization was broken in liquid nitrogen and immersed in a solvent (xylene or styrene) at 60° C. for 5 hours, and thereafter a broken-out section of the strand was observed with scanning electron microscope (SEM) with respect to the surface condition according to the criterion below.

○ . . . elution of domain is not observed,

X . . . domain is eluted.

(3) Bending Fatigue Resistance

The obtained dry film was subjected to twist test using Gelbo Flex-tester (Rigaku Kogyo) under the condition of 50% RH at 23° C. The test is performed by applying horizontal motion in 25 inch distance and then twisting 440° on 3.5 inch stroke 100 times (40 cycles/minute). After the test, number of pinholes developed in the center area of 28 cm×17 cm of the film is counted. The test was repeated 5 times, and the average value of the number of pinholes is calculated.

(4) Emulsification Dispersibility in Water 20 parts of resin composition pellet were mixed with 80 parts of water at room temperature, the obtained dispersion was immersed in hot water (80° C.) in a container and stirred for 90 minutes.

○ . . . uniform emulsified dispersion is obtained,

X . . . precipitate is generated or completely dissolved solution is obtained.

(5) Surface Free Energy

A melt-molded film is humidity controlled by still standing in a desiccator with phosphorus pentoxide for 10 days, and thereafter measured with respect to static contact angle against water, methylene iodide, and 1-bromonaphthalene with use of contact angle meter ("automatic dynamic contact angle meter DCA-VZ150" from Kyowa Interface Science Co., Ltd). The surface free energy is calculated based on the measurement value.

(6) Electrochemical Stability

A response current variation during sweeping electrode potential is measured with V-4C voltammetry cell from BAS Inc.

The produced electrode for a working electrode (electrode area 0.25 cm$^2$), platinum electrode for a counter electrode, silver electrode (Ag/Ag$^+$:AgSO$_3$CF$_3$) for a reference electrode, and a solution prepared by dissolving 1M LiPF$_6$ in a mixed liquid of ethylene carbonate (EC) and ethyl methyl carbonate (EMC) ((EC/EMC=3/7 (volume ratio), KISHIDA CHEMICAL Co., Ltd.) for the electrolyte solution are used respectively.

A response current is measured using electrochemical measurement system "Solartron 1280Z" (Solartron Analytical) under the condition of sweeping electrode potential (voltage sweep rate 5 mV/sec, voltage sweep range −0.5 and 2.4 V (to reference electrode)). The measurement was carried out at 25° C. for 5 cycles.

In the obtained voltammogram (which is a plot of the response current values vs. applied voltage), if the response current value at 2.4 V reduces to 0.6 mA/cm$^2$ or less, or if spike-like transient current is appeared during 5 cycles, it is supposed that the current is relatively hard to flow due to separation and removal of coating resulting from the oxidation degradation of the coating.

[Preparation of Resin Composition]

(1) Side Chain 1,2-Diol-Containing PVA-Based Resin (A)

In a reaction vessel with reflux condenser and stirrer, 68.0 parts of vinyl acetate, 23.8 parts of methanol and 8.2 parts of 3,4-diacetoxy-butene were fed, and azobisisobutyronitrile was added in amount of 0.3 mol % to the amount of vinyl acetate. The mixture was heated with stirring under nitrogen flow and allowed to initiate the polymerization reaction. The polymerization reaction was finished by adding m-dinitrobenzene to the reaction system when conversion of vinyl acetate was reached to 90%. Subsequently methanol vapor was blown and thereby removing residual vinyl acetate monomer from the reaction system to obtain a methanol solution of the resultant copolymer.

Next, the obtained methanol solution was adjusted to 45% in concentration by diluting with methanol, and charged in a kneader, followed by saponification. The saponification was carried out by adding sodium hydroxide (2% methanol solution) in amount of 11.5 mmol per 1 mol of the total amount of vinyl acetate structural unit and 3,4-diacetoxy-1-butene structural unit of the copolymer, under keeping the solution temperature of 35° C.

A saponified product was separated in the course of the saponification. After generation of particles of the saponified product, the saponified product particles were filtrated, and sufficiently washed with methanol, followed by drying in hot air oven to obtain PVA-based resin having 1,2-diol in a side chain structural unit (A1)) represented by formula (1a).

The obtained side chain 1,2-diol-containing PVA-based resin (A1) had a saponification degree of 99.9 mol % and average polymerization degree of 450. The saponification degree was calculated based on alkali consumed amount required for hydrolysis of the remained vinyl acetate and 3,4-diacetoxy-1-butene. The average polymerization degree was measured according to JIS K6726. The content of 1,2-diol structural unit represented by the formula (1a), which was calculated as integrated value of $^1$H-NMR chart (300 MHz proton NMR, d6-DMSO solution, internal standard material: tetramethylsilane, 50° C.), was 6 mol %. Also the side chain 1,2-diol-containing PVA-based resin (A1) had MFR (210° C., load of 2160 g) of 5.5 g/10 minutes and a melting viscosity (220° C., shear rate 122 sec$^{-1}$) of 1148 Pa·s.

(2) Polar Functional Group-Containing Fluororesin (Modified Fluororesin) (B1)

In a deaerated 430 L-vessel with stirrer, 1-hydrotridecafluorohexane 200.7 kg as a solvent and 1,3-dichloro-1,1,2,2,3-pentafluoropropane ("AK225cb" from ASAHI GLASS CO., LTD., hereinafter called as "AK225cb") 55.8 kg were fed, and 1.3 kg of CH$_2$=CH(CF$_2$)$_4$F was added as a polymerizable monomer. As monomers to be polymerized, hexafluoropropylene (HFP) 122.2 kg, tetrafluoroethylene (TFE) 36.4 kg and ethylene (E) 1.2 kg were injected, and heated up to 66° C. in the polymerization vessel. Polymerization was initiated by adding 85.8 g of tert-butyl peroxypivalate as a polymerization initiator. In order to keep a constant pressure in the polymerization system, gaseous mixture of monomers having a molar ratio of TFE/E=54/46 was continuously fed, as well as CR$_2$=CH(CF$_2$)$_4$F and itaconic anhydride as a polar functional group-containing compound were continuously fed so that the contents of CH$_2$=CH(CF$_2$)$_4$F and the polar functional group-containing compound were 1.0 mol % and 0.35 mol % respectively based on the amount of the TFE/E monomer mixture. The gaseous mixture of monomers 29 kg was supplied at the time of 3.6 hours after initiating the polymerization, the polymerization system was cooled down to room temperature and purged to normal pressure.

A fluororesin having acid anhydride group as a polar functional group was obtained by removing the solvent from the obtained slurry, and dried at 130° C. for 4 hours by vacuum drying, yielding 30 kg of acid anhydride group-containing fluororesin (B1).

The acid anhydride group-containing fluororesin (B1) has a crystallization temperature of 175° C., Q value of 12 mm$^3$/s, and a composition of comonomers TFE/E/HFP/CH$_2$=CH(CF$_2$)$_4$F/itaconic anhydride=47.83/42.85/7.97/1.00/0.35 (mol %).

Figure 1:
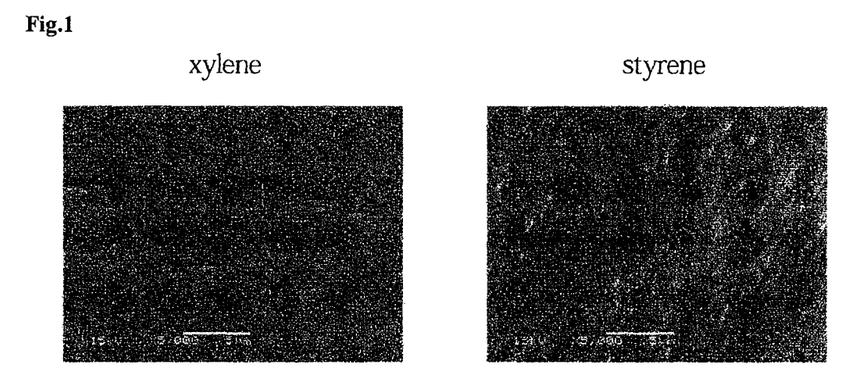
FIG. 1 depicts a micrograph (×5000) of the film of Example No. 2 taken after its solvent resistance test.

(3) Preparation of Resin Composition of Example Nos. 1 to 3 and Production of Pellet and Film Thus obtained side chain 1,2-diol-containing PVA-based resin (A1) and acid anhydride group-containing fluororesin (B1) were dryblended at a mass ratio shown in Table 1 to prepare resin composition Nos. 1 to 3. Each composition was pelletized with a twin screw extruder (TECHNOVEL CORPORATION) under the conditions below:
  screw diameter: 15 mm
  L/D=60 mm
  direction of rotation: same direction
  screw pattern: 3 mixing zones
  screen mesh: 90/90 mesh
  screw rotation speed: 200 rpm
  temperature pattern: C1/C2/C3/C4/C5/C6/C7/C8/D=180/200/210/210/215/215/220/220/220° C.
  resin temperature: 225° C.
  flow rate: 1.5 kg/hr Thus produced resin composition pellet were formed into film having 30 μm thickness with the twin screw extruder (TECHNOVEL CORPORATION) under the conditions below:

diameter (D): 15 mm,
  L/D=60
  screw pattern: 3 mixing zones
  vent: C7 open
  temperature pattern: C1/C2/C3/C4/C5/C6/C7/C8/D=180/200/210/210/215/215/220/220/220° C.
  screen mesh: 90/90 mesh
  screw rotation speed: 200 rpm
  resin temperature: 225° C.
  flow rate: 1.5 kg/hr
  die: 300 mm width, coat hanger type
  take-off speed: 2.6 m/min
  roll temperature: 50° C.
  air gap: 1 cm Gas-barrier property, solvent resistance, and emulsification dispersibility in water of film and pellet were evaluated according to the evaluation methods mentioned above. The measurement results were shown in Table 1. FIG. 1 is a micrograph taken after the solvent resistance test of Example No. 2 film produced by melt-molding.

(4) Comparative Example No. 1

Figure 2:
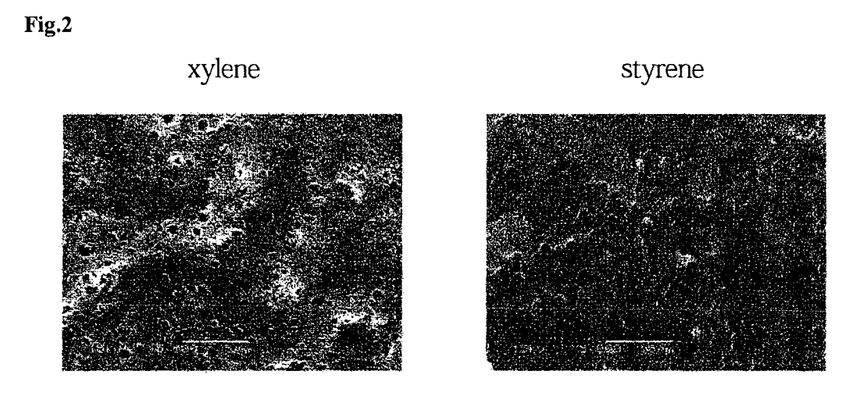
FIG. 2 depicts a micrograph (×5000) of the film of Comparative Example No. 1 taken after its solvent resistance test.

The resin composition of Comparative Example No. 1 was prepared in the same manner as above Examples except using the mixture of 10 parts of styrene/ethylene/styrene block copolymer without carboxyl group ("Tuftec® H1041" from Asahi Kasei Corporation) and 10 parts of styrene/ethylene/butylene block copolymer with carboxyl group ("Tuftec® M1911" from Asahi Kasei Corporation, acid value 2 mg $CH_3ONa/g$) in place of 20 parts of the polar functional group-containing fluororesin. Pellet and film were produced using the resin composition and evaluated with respect to gas-barrier property, solvent resistance, and emulsification dispersibility in water in the same manner as Examples. The measurement results are also shown in Table 1. FIG. 2 is a micrograph taken after the solvent resistance test of the film produced by melt-molding.

(5) Reference Example

Reference Example was prepared with use of side chain 1,2-diol-containing PVA-based resin alone, and evaluated in the same manner as Examples. The measurement result is also shown in Table 1.

Fluororesin with no polar group (polytetrafluoroethylene) 20 parts was mixed with side chain 1,2-diol-containing PVA-based resin (A1) for preparation of a resin composition thereof, however, the preparation was failed due to separation of the components from each other.

TABLE 1

|  |  | Example 1 | Example 2 | Example 3 | Comparative Example 1 | Reference Example |
|---|---|---|---|---|---|---|
| composition (parts) | side chain 1,2-diol-containing PVA-based resin | 90 | 80 | 70 | 80 | 100 |
|  | modified fluororesin | 10 | 20 | 30 | — | — |
|  | SEBS/modified SEBS mixture | — | — | — | 20 | — |
| evaluation | gas-barrier property | 11 | 11 | 12 | 14 | 8 |
|  | solvent resistance (xylene) | ○ | ○ | ○ | X | ○ |
|  | solvent resistance (styrene) | ○ | ○ | ○ | X | ○ |
|  | bending fatigue resistance (number of pinholes) | 205 | 168 | 71 | 38 | split |
|  | emulsification dispersibility | ○ | ○ | ○ | SEBS precipitation | dissolution |
|  | surface free energy (mN/m) | 43.4 | 41.9 | 40.4 | — | 51.7 |

As shown in Table 1, resin composition of Comparative Example No. 1 containing a thermoplastic elastomer component was remarkably improved in bending fatigue resistance, meaning that a problem on side chain 1,2-diol-containing PVA-based resin was solved (see Reference Example). However, the Comparative Example No. 1 was not satisfied with solvent resistance because the domain was eluted by immersing in styrene or xylene as clearly shown in FIG. 2. Moreover, emulsified dispersion of thermoplastic elastomer was not obtained from the Comparative Example No. 1.

On the other hand, resin compositions of Example Nos. 1 to 3, each containing polar functional group-containing fluororesin was improved in bending fatigue resistance, and solved the problem on side chain 1,2-diol-containing PVA-based resin, while the advantage of solvent resistance inherent in the side chain 1,2-diol-containing PVA-based resin was still maintained. In addition, emulsified dispersion was prepared from each of these resin compositions. The surface free energy of film produced by melt-molding the resin compositions was smaller than that of the film made from the side chain 1,2-diol-containing PVA-based resin film alone (Reference Example). Accordingly, in the case of films of Example Nos. 1 to 3, adsorption of foreign matters on surfaces thereof or adsorption between winding film and already wound film during winding is suppressed.

[Production and Evaluation of Binder for Lithium-Ion Secondary Battery Electrode]

(1) Preparation of Binder for Lithium-Ion Secondary Battery Electrode

Example No. 4

Thus prepared resin composition pellet of Example No. 2 was dissolved in water to obtain emulsified dispersion (20 mass %). 5.0 parts of the emulsified dispersion, 0.5 parts of carboxymethyl cellulose (NIPPON PAPER Chemicals CO., LTD., F20LC) aqueous solution (2 mass %) as thickening agent, 2.0 parts of acetylene black as conductive additive, and 6.6 parts of water were blended and mixed with planetary mixer to obtain a slurry for measurement. The resulting binder for the slurry has a composition containing binder resin component, thickening agent, and dispersion medium respectively in the contents (mass) shown in Table 2.

Thus prepared measurement slurry was applied over aluminum foil having 20 μm thickness with applicator (clearance: 170 μm), and kept at 80° C. for 10 minutes, thereafter heated up to 105° C. over 25 minutes, followed by drying at 105° C. for 10 minutes. After drying, the coated foil was compressed with roll press (clearance: 12 μm) and dried at 130° C. for 24 hours under reduced pressure to obtain a working electrode.

Figure 3:
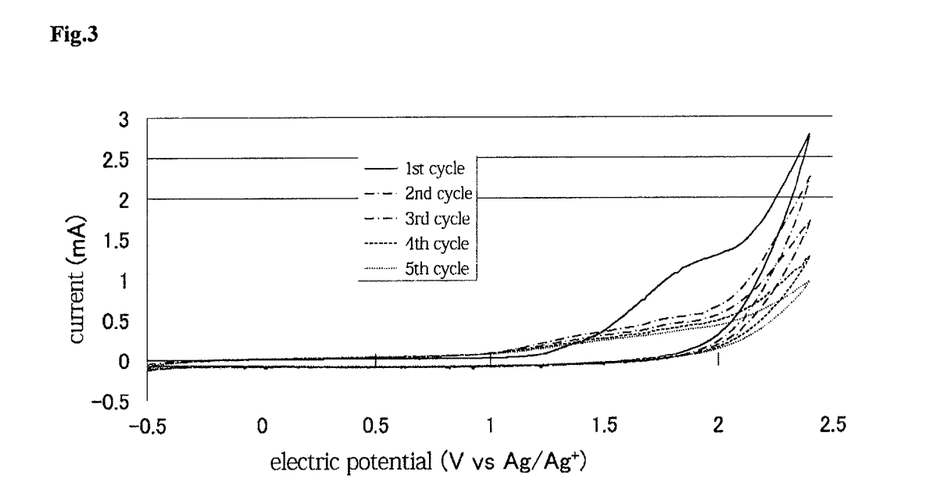
FIG. 3 depicts a voltammogram of Example No. 4 obtained after its electrochemical stability test.

Electrochemical stability of thus produced working electrode was evaluated according to the above-mentioned evaluation method. The obtained cyclic voltammogram was shown in FIG. 3, and evaluation results are shown in Table 2.

Comparative Example No. 2

Figure 4:
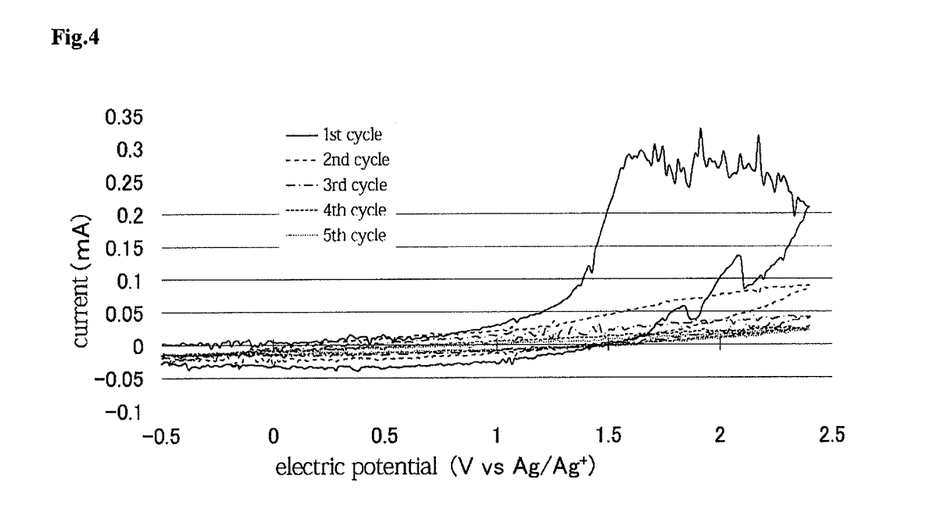
FIG. 4 depicts a voltammogram of Comparative Example No. 2 obtained after its electrochemical stability test.

Polyvinylidene fluoride was used for binder resin component, and N-methylpyrrolidone (#1100 from KISHIDA CHEMICAL Co., Ltd.) solution dissolving the polyvinylidene fluoride in the concentration of 8 mass % was used for binder. Acetylene black as conductive additive was added to the binder and mixed to produce the slurry for working electrode in the same manner as Example No. 4. The working electrode was produced using the slurry in the same manner as Example No. 4, and evaluated. The obtained cyclic voltammogram is shown in FIG. 4, and evaluation results are shown in Table 2.

Comparative Example No. 3

Figure 5:
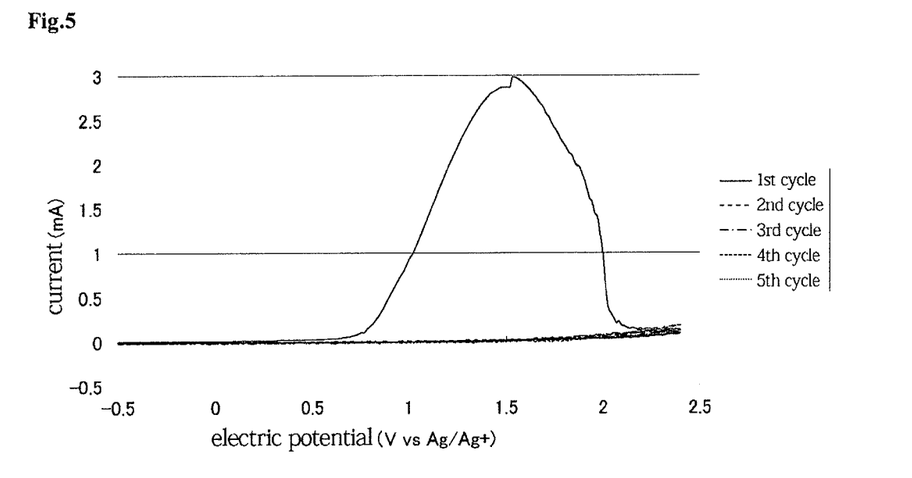
FIG. 5 depicts a voltammogram of Comparative Example No. 3 obtained after its electrochemical stability test.

Aqueous dispersion (48.4 mass %) dissolving styrene-butadiene rubber as a binder resin component and carboxymethyl cellulose aqueous solution (2 mass %) as thickening agent used in Examples No. 4 were blended at a content ratio shown in Table 2 to prepare a binder. To this binder, acetylene black was added as conductive additive and mixed to prepare the slurry for working electrode in the same manner as Example No. 4. The working electrode was produced using the slurry in the same manner as Example No. 4, and evaluated. The obtained cyclic voltammogram is shown in FIG. 5, and evaluation results are shown in Table 2.

TABLE 2

| binder | | | Example 4 | Comparative Example 2 | Comparative Example 3 |
|---|---|---|---|---|---|
| composition | binding component | type | resin composition of Example 2 (PVA (A1) + modified fluororesin) | PVDF | SBR |
| | | content by percentage (%) | 8.3 | 4.7 | 11.1 |
| | thickening agent | type | CMC | — | CMC |
| | | content by percentage (%) | 0.1 | — | 0.9 |
| | dispersion medium | type | water | N-methylpyrrolidone | water |
| | | content by percentage (%) | 91.6 | 95.3 | 88.0 |
| evaluation | spike-like current separation of coating | | no observed no separation | observed separation | no observed no separation |

PVA (A1): side chain 1,2-diol-containing PVA
CMC: carboxymethyl cellulose
PVDF: polyvinylidene fluoride
SBR: styrene-butadiene rubber When an aluminum foil is solely used as a working electrode and measured with cyclic voltammetry, it is known such phenomena that the surface of aluminum foil is oxidized and electric current becomes hard to flow. Both binders of Comparative Example No. 2 employing PVDF as a binder resin component and Comparative Example No. 3 employing styrene-butadiene rubber as a binder resin component were drastically decreased in the electric current value after the 2nd cycle as well as current became hard to flow. In the Comparative Example No. 2, the current value was small from the 1st cycle, a spike current was observed around 1.5 V, which is supposed due to that the coating layer was separated and removed. In fact, the appearance of the electrode after the measurement of 5th cycle was visually checked, and the separation of the coating was confirmed. This is supposed that PVDF as a binding component exhibited relatively low binding ability to a current collector was, and was oxidated and degraded at least 1.5 V in applied voltage.

In the case of the binder of Comparative Example No. 3 employing styrene-butadiene rubber, the current arrived at relatively as high as 2.5 mA/cm$^2$ at the 1st cycle, but decreased around 1.5 V of the applied voltage, and thereafter held a low current value, which means the coating was separated and removed. Actually, the coating was visually observed after measuring for 5th cycle and the separation of the coating was confirmed. Such separation is presumed to result from that the styrene-butadiene rubber as a binding component was oxidated and degraded at least 1.5 V.

As seen from these results, binders employing PVDF (Comparative Example No. 2) or styrene-butadiene rubber (Comparative Example No. 3) as a binding component were insufficient for an electrode. Because the binders employing PVDF (Comparative Example No. 2) or styrene-butadiene rubber (Comparative Example No. 3) as a binding component provided insufficient binding strength and provided a coating easily to be oxidated or degraded caused from high voltage. In addition, such binders exhibited low stability to electrolyte solution as well as low electrochemical stability. These results are supposed that the binders did not have flexibility sufficient enough to follow repetitive expansion and contraction caused from the redox of the electrode.

On the other hand, with respect to the binder of Example No. 4, which employing an inventive resin composition (comprising a combination of the side chain 1,2-diol-containing PVA and polar group-containing fluororesin) as a binding component, the tendency of increase of the response current with increase of electric potential was steady, regardless of decrease of the current value with repeating charging/discharging cycles. After measurement for 5th cycles, the appearance of the electrode was visually checked, but the separation and removal of the coating was not observed. The current value was kept high even after the measurement for 5th cycles, and no spike current was observed. Therefore, it is supposed that no separation of the coating to be visually observed was occurred. Accordingly, the binder of the present invention has an enhanced binding strength to the current collector. In addition, the binder is excellent in electrochemical stability because the resulting coating is free from oxidation and degradation even under high voltage and has resistance to electrolyte solution. Moreover, the coating is flexible enough to follow the repeat of expansion and contraction of the electrode caused from the redox thereof. Accordingly, the electrode using a binder of the present invention is electrochemically stable to the repetitive charging and discharging.

INDUSTRIAL APPLICABILITY

The resin composition of the invention is improved in bending fatigue resistance of PVA-based resin, and still has gas-barrier property and solvent resistance which are advantage of the PVA-based resin, and is melt-moldable. Accordingly, the resin composition is suitably used for wrapping material or wrapping container for a variety of food and beverage, medicine, and chemical product. Since the film produced by melting method has a relatively small free energy on surface, the film is industrially advantageous because of easily rolling up at room temperature and normal humidity.

The resin composition of the present invention is capable of providing an emulsified dispersion in which polar functional group-containing fluororesin is uniformly dispersed, which is used for a binder. Such binder is capable of forming a coating with excellent solvent resistance. Such coating is flexible enough to follow the repeat of expansion and contraction of the electrode caused from the redox thereof. The coating is also excellent in electrochemical stability, and therefore preferably used for a binder for lithium-ion secondary battery electrode with repetitive charging and discharging.

The invention claimed is:

1. A resin composition comprising:
   (A) polyvinyl alcohol-based resin containing a structural unit represented by the following formula (1), and
   (B) fluororesin containing a polar functional group capable of reacting with or forming hydrogen bond(s) with a hydroxyl group, which is hereinafter referred to as "polar functional group-containing fluororesin":

wherein each of $R^1$ to $R^6$ is independently hydrogen or an organic group, and X is a single bond or a binding chain.

2. The resin composition according to claim 1, wherein the polar functional group is carbonyl-containing group or hydroxyl group.

3. The resin composition according to claim 2, wherein the carbonyl-containing group is at least one selected from the group consisting of carbonate group, haloformyl group, aldehyde group, ketone group, carboxyl group, alkoxycarbonyl group, carboxylic anhydride group, and isocyanate group.

4. The resin composition according to claim 1, wherein the (B) polar functional group-containing fluororesin is a copolymer containing at least tetrafluoroethylene as a constituent monomer.

5. The resin composition according to claim 4, wherein the (B) polar functional group-containing fluororesin further contains ethylene as a constituent monomer thereof.

6. The resin composition according to claim 5, wherein the (B) fluororesin constituting the polar functional group-containing fluororesin is one selected from the group consisting of ethylene/tetrafluoroethylene-based copolymer, ethylene/tetrafluoroethylene/hexafluoropropylene-based copolymer, ethylene/tetrafluoroethylene/$CH_2$=CH—Rf based copolymer wherein Rf is perfluoroalkyl group having from 2 to 6 carbon atoms, and ethylene/tetrafluoroethylene/hexafluoropropylene/$CH_2$=CH—Rf based copolymer wherein Rf is perfluoroalkyl group having from 2 to 6 carbon atoms.

7. The resin composition according to claim 1, wherein the polar functional group-containing fluororesin has a melting point of 120 to 220° C.

8. The resin composition according to claim 1, wherein the content mass ratio (A/B) of the (A) polyvinyl alcohol-based resin to the (B) polar functional group-containing fluororesin is in the range of 98/2 to 2/98.

9. A pellet produced by melt-kneading a resin composition comprising
   (A) polyvinyl alcohol-based resin containing a structural unit represented by the following formula (1), and (B) fluororesin containing a polar functional group capable of reacting with or forming hydrogen bond(s) with hydroxyl group (hereinafter called as "polar functional group-containing fluororesin"):

[formula 1]

(1)

wherein each of $R^1$ to $R^6$ is independently hydrogen or an organic group, and X is single bond or a binding chain.

10. A producing method of a resin composition comprising
(A) polyvinyl alcohol-based resin containing a structural unit represented by the following formula (1), and (B) fluororesin containing a polar functional group capable of reacting with or forming hydrogen bond(s) with hydroxyl group wherein each of $R^1$ to $R^6$ is independently hydrogen or an organic group, and X is single bond or a binding chain,

[formula 1]

(1)

comprising a process of melt-kneading the (A) polyvinyl alcohol-based resin with the (B) polar functional group-containing fluororesin.

11. An emulsified dispersion comprising
(A) polyvinyl alcohol-based resin containing a structural unit represented by the following formula (1);
(B) fluororesin containing a polar functional group capable of reacting with or forming hydrogen bond(s) with hydroxyl group; and
a dispersion medium dissolving or uniformly miscible with the (A) polyvinyl alcohol-based resin,

[formula 1]

(1)

wherein each of $R^1$ to $R^6$ is independently hydrogen or an organic group, and X is single bond or a binding chain.

12. A binder comprising an emulsified dispersion according to claim 11.

13. The binder according to claim 12, being used for a lithium-ion secondary battery electrode.

14. The resin composition according to claim 1, wherein the content mass ratio (A/B) of the (A) polyvinyl alcohol-based resin to the (B) polar functional group-containing fluororesin is in the range of 98/2 to 30/70.

15. The emulsified dispersion according to claim 11, wherein the content mass ratio (A/B) of the (A) polyvinyl alcohol-based resin to the (B) polar functional group-containing fluororesin is in the range of 95/5 to 55/45.

* * * * *